United States Patent [19]
Sasse

[11] Patent Number: 6,021,875
[45] Date of Patent: Feb. 8, 2000

[54] HYDRODYNAMIC TORQUE CONVERTER WITH A CHOKE ELEMENT

[75] Inventor: Christoph Sasse, Schweinfurt, Germany

[73] Assignee: Mannesmann Sachs AG, Schweinfurt, Germany

[21] Appl. No.: 09/138,292

[22] Filed: Aug. 21, 1998

[30] Foreign Application Priority Data

Aug. 21, 1997 [DE] Germany .......................... 197 36 297

[51] Int. Cl.[7] .................................................. F16D 33/00
[52] U.S. Cl. ........................ 192/3.21; 192/3.22; 192/3.23
[58] Field of Search ................................. 192/3.21, 3.22, 192/3.33; 60/330, 331, 332

[56] References Cited

U.S. PATENT DOCUMENTS

| | | | |
|---|---|---|---|
| 4,167,854 | 9/1979 | Diemer et al. ............................. | 60/331 |
| 4,625,512 | 12/1986 | Morrow, Sr. ............................... | 60/353 |

FOREIGN PATENT DOCUMENTS

| | | | |
|---|---|---|---|
| 884 141 | 7/1953 | Germany ..................................... | 47/18 |
| 44 23 640 A1 | 6/1995 | Germany ........................ | F16H 45/02 |
| 36-002607 | 4/1961 | Japan . | |
| 37-001418 | 2/1962 | Japan . | |
| 38-010466 | 6/1963 | Japan . | |
| 40-022001 | 7/1965 | Japan . | |
| 57-069164 | 4/1982 | Japan . | |
| 4-107568 | 9/1992 | Japan . | |
| 314157 | 4/1928 | United Kingdom . | |
| 447282 | 11/1934 | United Kingdom . | |
| 810458 | 3/1959 | United Kingdom . | |

*Primary Examiner*—Charles Marmor
*Assistant Examiner*—Tisha D. Waddell
*Attorney, Agent, or Firm*—Cohen, Pontani, Lieberman & Pavane

[57] ABSTRACT

A hydrodynamic torque converter has a converter circuit having at least a pump wheel and a turbine wheel, wherein each of these wheels has a blade amazement to form flow chambers, each of these blades being provided at its free end with a stiffener acting as part of a toroid. A choke element is provided which can move by a predetermined depth into the associated blade arrangement and serves to regulate the through-flow cross section for the hydraulic fluid of the converter circuit which is supplied in that it is connected via a line system to a supply arrangement. The choke element is arranged in the toroid and is provided with at least one choke projection which penetrates into a corresponding cutout in the toroid and can move into at least one associated flow chamber.

10 Claims, 6 Drawing Sheets

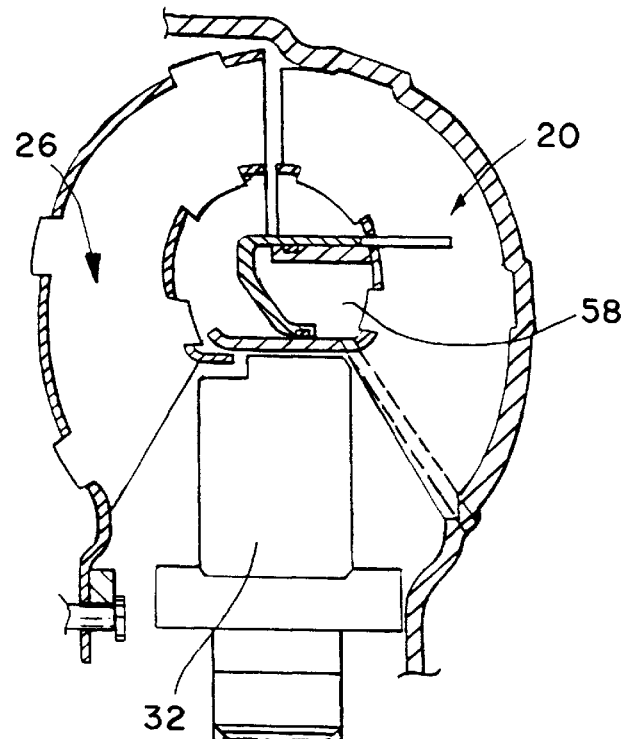
FIG.9
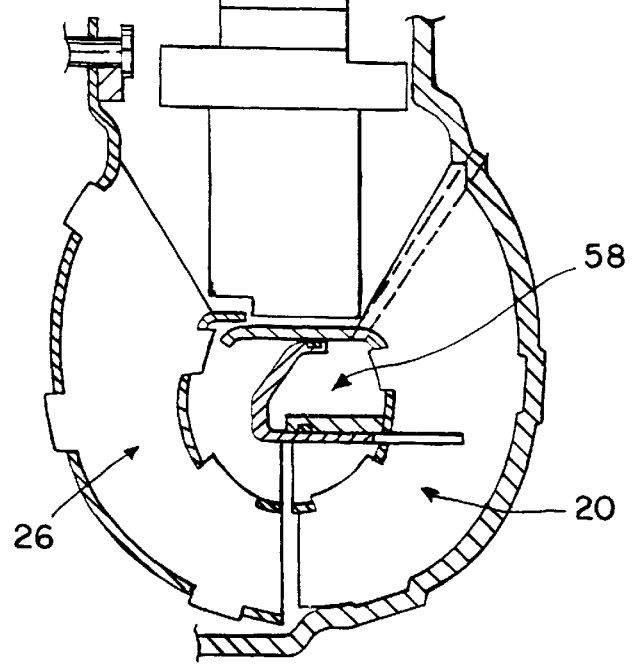

HYDRODYNAMIC TORQUE CONVERTER WITH A CHOKE ELEMENT

BACKGROUND OF THE INVENTION

1. Field of the Invention

The invention is directed to a hydrodynamic torque converter with a hydraulic converter circuit having at least a pump wheel and a turbine wheel, wherein each of these wheels has a blade arrangement forming flow chambers. A stiffener is disposed at a free end of each of these blade arrangements between the pump wheel and the turbine wheel. The stiffeners form part of a toroid. A choke element is mounted in the toroid and movable by a predetermined depth into the associated blade arrangement to regulate the through-flow cross section for the hydraulic fluid of the converter circuit which is connected via a line system to a supply arrangement.

2. Description of the Related Art

A prior art hydrodynamic torque converter having an impeller or pump wheel and a turbine wheel is disclosed in German reference DE-PS 884 141. Each of these wheels has a blade arrangement to form flow chambers, a rib or stiffener being formed at the free end of the blades. The stiffeners, together with a stiffener on the stator or guide wheel side, form a toroid.

According to FIG. 1 of the prior art reference, a choke element which slides into the flow path between the pump wheel and turbine wheel is displacably arranged on the driven shaft of the torque converter. A spring urges the choke element into a position in which it exercises its fill choke effect. The purpose of this choke element is close the converter circuit while the driving engine is being started and to switch the converter circuit on only after a determined rate of rotation of the engine has been reached. The opening of the converter circuit occurs automatically when, after reaching an adequate rate of rotation of the driving engine, a sufficient pressure has built up in the converter circuit to remove the choke element from the flow path between the pump wheel and turbine wheel against the action of the spring. The switching may occur suddenly if the spring has a very low rigidity; but the spring may also be selected enabling the adjustment of the choke element to determined intermediate position at a rate of rotation of the engine, wherein the choke element is partially moved into the flow path between the pump wheel and turbine wheel. In this way, the starting torque of the torque converter is adapted to the torque characteristic of the driving engine, so that problems with cold starting of diesel engines, for example, can be countered by changing the converter characteristic.

However, a problem with the prior art torque converter shown in FIG. 1 of the above-cited German patent is that it requires an enormous amount of axial space because the pump wheel and turbine wheel, choke element and spring are arranged next to one another axially and because the choke element must be allowed an axial displacement path corresponding to the depth to which this choke element penetrates into the flow path between the pump wheel and turbine wheel because only in this case can this flow path be either fly closed or fully opened. Since the axial installation space available for the torque converters is constantly being reduced in modern vehicles, especially in small trucks, the torque converter known from the above-cited patent is absolutely unsuitable for serial manufacture.

SUMMARY OF THE INVENTION

It is the object of the invention to develop a torque converter having a choke element in the converter circuit such that the torque converter is extremely compact in the axial direction.

The invention is realized in a torque converter having a converter circuit with at least a pump wheel and a turbine wheel. Each of the pump wheel and turbine wheel has a blade arrangement with flow chambers defined between blades of each blade arrangement. Each of the blades has a stiffener element acting as part of a toroid between the turbine wheel and the pump wheel. A choke element is arranged in the toroid. The choke element comprises a choke projection which penetrates into a corresponding cutout in the toroid and is insertable into an associated flow chamber for regulating the through-flow cross section in the associated flow chamber for the hydraulic fluid in the converter circuit.

Because the choke element is arranged in the toroid, which is already present in torque converters of this type, no additional installation space is required in the torque converter either in the axial direction or in the radial direction. Rather, an installation space which is otherwise unused, namely, the interior of the toroid, is utilized for receiving the choke element. The choke element has at least one choke projection which penetrates through a corresponding cavity in the toroid so that the choke projection may be pushed into the flow path of the converter Circuit. In this case, the axially extending length of the entire choke element, including the choke projection, preferably corresponds to the width of the toroid, so that when there is no need to choke, the choke element can be accommodated in its entirety within the toroid. Since the width of the toroid usually corresponds at least to the depth of penetration of the choke projection into the associated flow chamber, the flow chamber may be completely closed by a corresponding displacement of the choke element in the direction of the flow chamber. If the quantity of choke projections is equal in number to the quantity of flow chambers, the flow of converter fluid through the flow chambers can be brought virtually to a standstill. However, in an equally conceivable construction, the choke projections close only every second or third flow chamber. The corresponding design of the choke element with choke projections and their maximum penetration depth into the flow chambers may consequently be chosen freely and preferably selected in dependence on the operating behavior of the driving engine connected to the torque converter.

In an embodiment of the present invention, the choke projections are accommodated on a carrier disk so that, assuming a seal is arranged between the choke element and a slide guide for the same, a seating of a control chamber enclosed by these elements is achieved. Provided that this control chamber is connected to a control device, e.g., a regulated pressure source, by a control line, e.g., a pressure line, the control chamber may have a greater pressure than the converter circuit depending on the mode of operation of the control device, and the choke element may accordingly be pulled out of the flow path or, when the pressure is relieved in the control chamber, the pressure in the converter circuit which is now higher than the pressure in the control chamber is used to move the choke element into the converter circuit. Beyond the control chamber, the interior of the toroid is subject to the pressure of the converter circuit, so that the corresponding pressure acts on an associated application surface of the choke element.

A further advantageous embodiment form includes a spring in that the control chamber acting on the choke element in the opposite direction, since the deformation state of the spring, and therefore the depth of penetration of the choke projection into the associated flow chamber, is controllable via the pressure which can be applied in the control chamber. A torque convener of this kind may be operated with a large number of characteristics.

A further advantageous embodiment includes a control chamber formed in a cylinder arranged in the toroid, wherein the control line is connected to the cylinder and the piston rod which is displaceable axially along a seal in the cylinder forms the choke projection. When suitably shaped, this piston rod is provided with a working surface for the pressure in the converter circuit, so that when the pressure is relieved in the cylinder, the piston rod, and therefore the choke projection, is moved back into the cylinder. A plurality of individual cylinders may be provided, wherein a flow chamber is associated with each of these individual cylinders. But, in the case of an annular construction of the cylinder, a construction in which all flow chambers are blocked by one cylinder is also possible.

The various features of novelty which characterize the invention are pointed out with particularity in the claims annexed to and forming a part of the disclosure For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 9 is a simplified section of the torque converter of FIG. 1 showing an embodiment having two choke elements on opposing sides of the torque converter.

DETAILED DESCRIPTION OF THE PRESENTLY PREFERRED EMBODIMENTS

Figure 1:
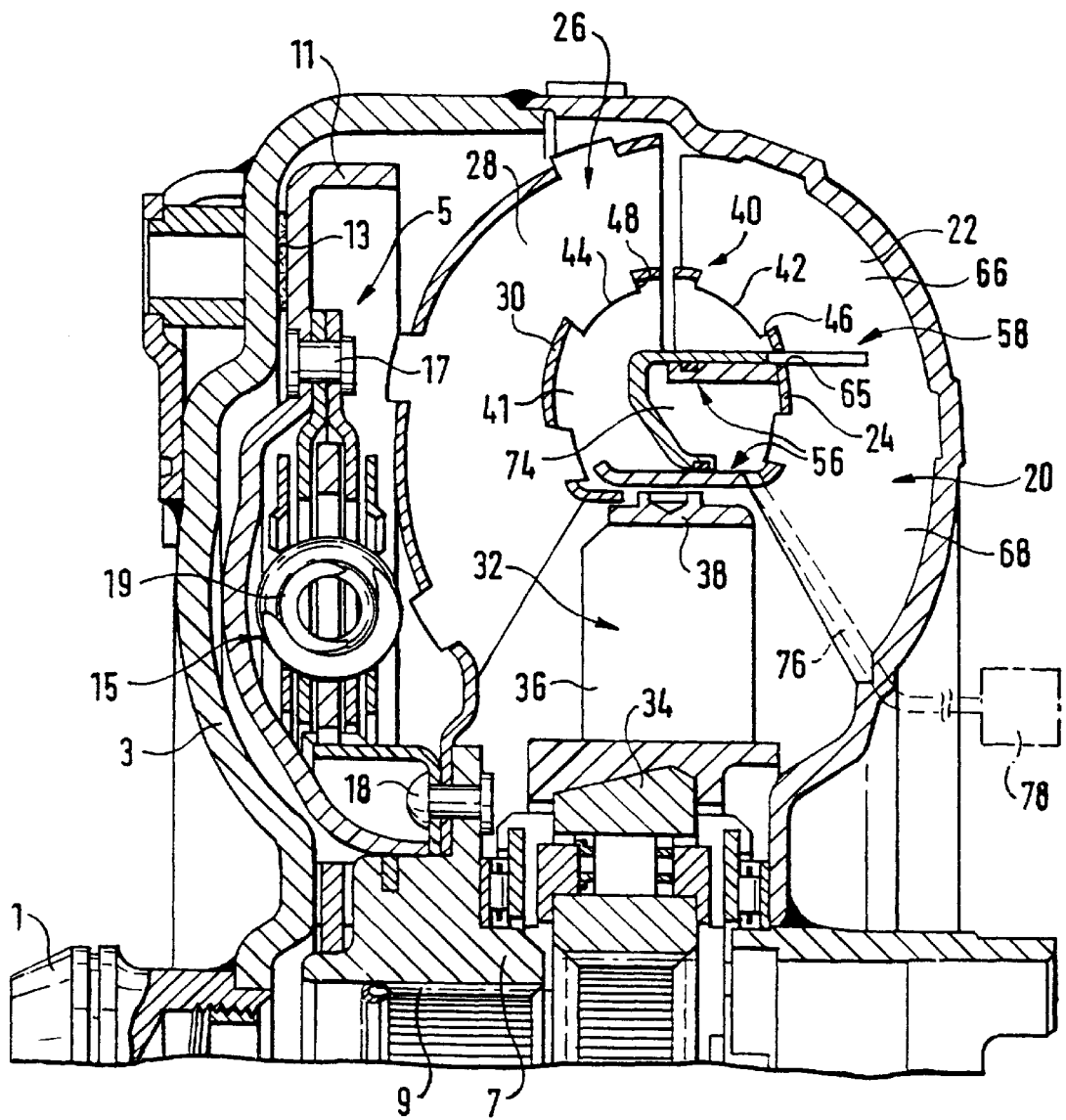
FIG. 1 shows the upper half of a longitudinal section through a torque converter with a toroid according to an embodiment of the present invention in which a choke element is displacably arranged in the toroid.

A hydrodynamic torque converter according to the present invention is shown in FIG. 1 with a drive journal 1 which is connectable with a drive, not shown, e.g., an internal combustion engine, and is fastened to a converter housing 3. The converter housing 3 can transmit its movement by a bridge coupling 5 to a turbine hub 7 and from there, via its toothing 9, to a driven shaft, not shown. For this purpose, a piston 11 of the bridge coupling 5 has a friction facing 13 which may be brought into frictional engagement with the converter housing 3. Associated with the piston 11 is a torsional vibration damper 15 having an input part fastened, e.g., by a rivet 17, to the piston 11 and having an output part fastened by a rivet 18 to the turbine hub 7. The input part and output part of the torsional vibration damper are connected with one another by a spring suspension 19 which extends in the circumferential direction.

The converter housing 3 forms a pump wheel 20 or impeller on its side remote of the bridge coupling 5. The pump wheel 20 comprises a blade arrangement 22 which forms flow chambers 68 between every two blades 66. The free ends of the blades 66 in the blade arrangement 22 facing away from housing 3, are interconnected by an annular stiffener 24. In the same way, a turbine wheel 26 is fastened to the turbine hub 7 having a blade arrangement 28 and a stiffener 30 is connected at the free end of the blade arrangement 28. A guide wheel 32 which is arranged axially between the pump wheel 20 and turbine wheel 26 and is seated on a freewheel 34 also has a blade arrangement 36 with a stiffener 38 at the free end of the blade arrangement 36. The stiffeners 24, 30 and 38 form a toroid 40 which encloses an interior space 41. The outer walls of this toroid are fixedly received in the blade arrangements 22, 28 by tabs 42, 44 of the blade arrangements 22, 28, which tabs 42, 44 engage in recesses 46, 48. Nevertheless, the toroid 40, with respect to its pressure, is comparable with the rest of the converter circuit which is connected with a supply arrangement via a line system with switchable inlet and outlet lines in accordance, for example, with German reference DE 44 23 640 A1. Therefore, this line system with the supply arrangement is not shown.

Figure 2:
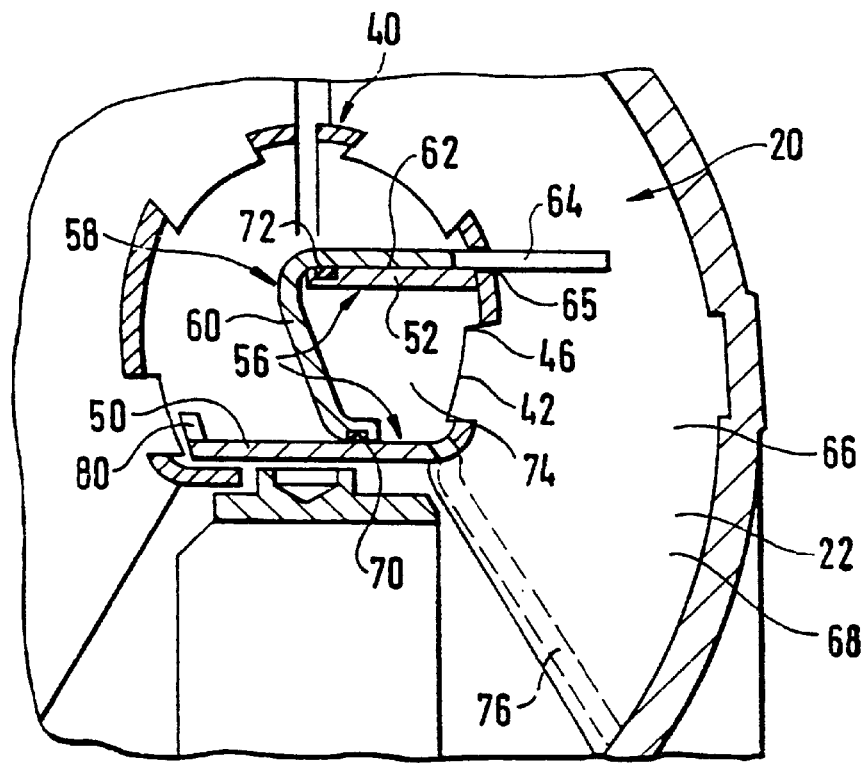
FIG. 2 shows a detail of the toroid with the choke element of FIG. 1, wherein the choke element is moved into the associated flow chamber.
Figure 3:
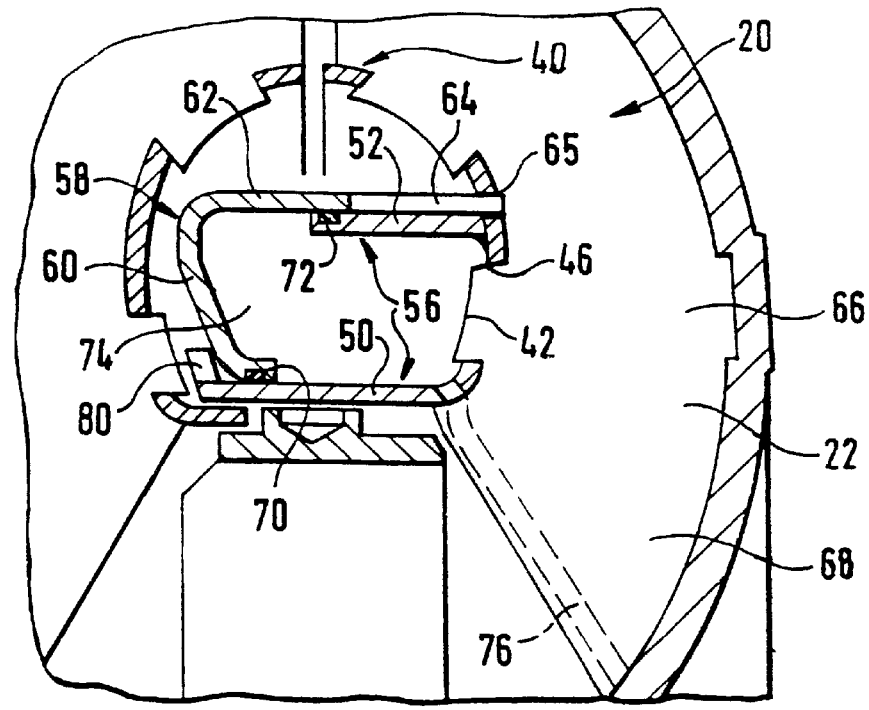
FIG. 3 shows a derail of the toroid with the choke element as in FIG. 2, with the choke element drawn back into the toroid.

Referring also to FIGS. 2 and 3, a sliding rail 50 extends in the axial direction radially adjacent to the stiffener 38 of the freewheel 34 in the interior 41 of the toroid 40. A support ring 52 which is located farther outward radially is associated with this sliding rail 50. The support ring 52 is fastened to the inner wall of the toroid 40 by, for example, a weld and together with the sliding rail 50, forms a slide guide 56 for a choke element 58. The choke element 58 has a carrier disk 60 which is arranged on the sliding rail 50 and extends essentially radially outwardly from the sliding rail 50 and a connection ring 62 which adjoins the carrier disk 60 essentially in the axial direction. The connection ring 62 is provided at its free end with a plurality of choke projections 64, extending through a cutout 65 in the toroid 40 radially outside of the support ring 52. A first seal 70 is arranged radially between the sliding rail 50 and the carrier disk 60, and a second seal 72 is arranged radially between the support ring 52 and the connection ring 62. As a result of these seals 70, 72, a control chamber 74 is formed between the slide guide 56 and the choke element 58. Given a suitably pressure-tight connection between the tabs 42 and the recess 46, the control chamber 74 can have an internal pressure diverging from that of the converter circuit. The control chamber 74 is connected to a control device 78, for example, in the form of a controllable pressure source, shown in FIG. 1, to preset the internal pressure via a control line 76.

The choke clement 58 operates as follows: As long as the control chamber 74 is kept without pressure, an overpressure is present at the side of the carrier disk 60 of the choke element 58 remote from the control chamber 74 due to the above-mentioned pressure in the interior space 41 of the toroid 40 relative to the converter circuit. This overpressure in the interior space 41 causes the choke element 58 to be displaced into the end position shown in FIG. 2. The end position is reached as soon as the carrier disk 60 reaches the support ring 52 and the choke projections 64 project into the respectively associated flow chambers 68. Apart from being determined by the length of the choke projections 64 and the displacement path of the choke element 58, the depth to which the choke projections 64 penetrate into the flow chambers 68 is also determined by the axial width of the pump wheel 22.

For the choke element 58 to move into the interior 41 of the toroid 40, pressure is applied to the control chamber 74 by the control device 78 via the control line 76, this pressure being greater than that in the converter circuit. This overpressure in the control chamber 74 acts on the control chamber side of the carrier disk 60 and consequently displaces the choke element 58 to the left, with reference to FIG. 3, until the choke element 58 contacts the support 80 of the sliding rail 50. For this purpose, the support ring 52 of the slide guide 56 is constructed such that its length is great enough in the axial direction that it covers the connection ring 62 of the choke element 58 by the seal 72. The empty spaces remaining in the circumferential direction between every two choke projections 64 are accordingly located beyond the seal 72, so that the sealing of the control chamber 74 is ensured also when the choke element 58 is drawn back into the interior 41 of the toroid 40.

Figure 4:
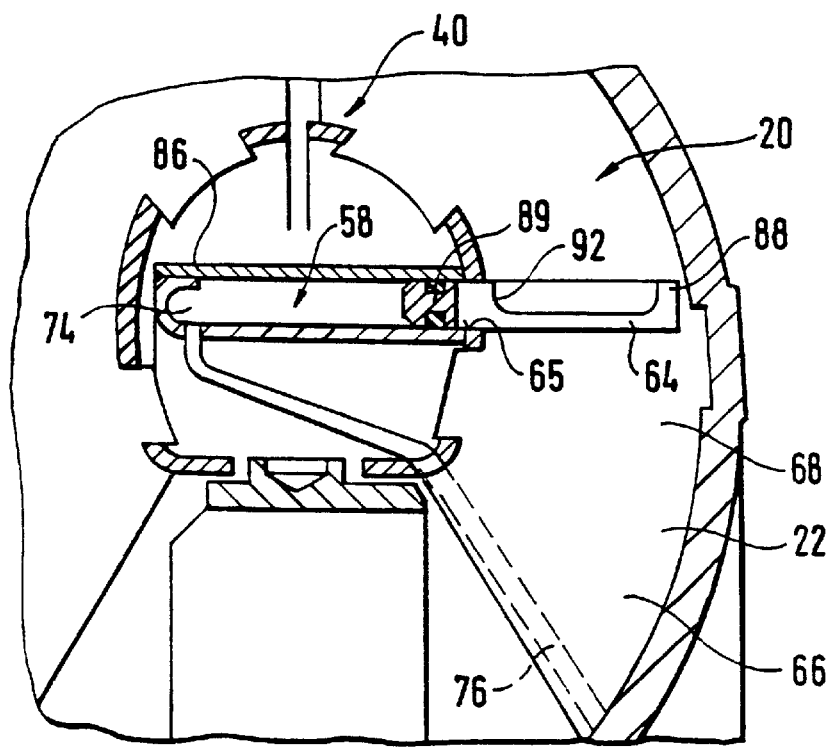
FIG. 4 shows a detail of the toroid with a choke element according to another embodiment of the present invention, wherein the choke element includes a a piston rod inserted in a cylinder and which moves into the flow chamber.
Figure 5:
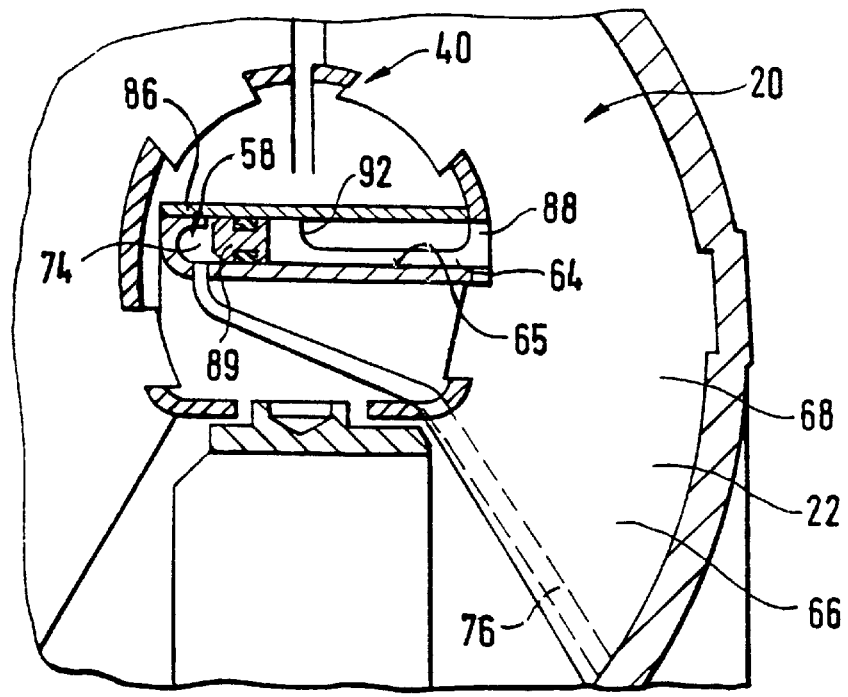
FIG. 5 shows the detail as in FIG. 4. wherein the piston rod is moved into the cylinder.

FIGS. 4 and 5 show a completely different embodiment form of a choke element 58, in which the choke element 58 is constructed as a cylinder 86 surrounding the control chamber 74. The cylinder 86 is connected to the control device 78 by the control line 76 and, at its front end, receives, via a seal, a piston rod 88 which extends through the cutout 65 in the toroid 40. The piston rod 88 is provided with a working surface 92 for receiving the pressure in the converter circuit so that as soon as the control chamber 74 is without pressure the piston rod 88 moves into the cylinder 86. Conversely, when the cylinder 86 is acted upon by overpressure, the piston cod 88 is moved out, wherein this piston rod 88 acts as a choke projection 64 of the choke element 58. Since the seal 89 is located at the piston 88 and accordingly follows its movement, the control chamber 74 is separated at all times from the converter circuit with respect to pressure regardless of the extent to which the piston 88 travels outward.

Figure 6:
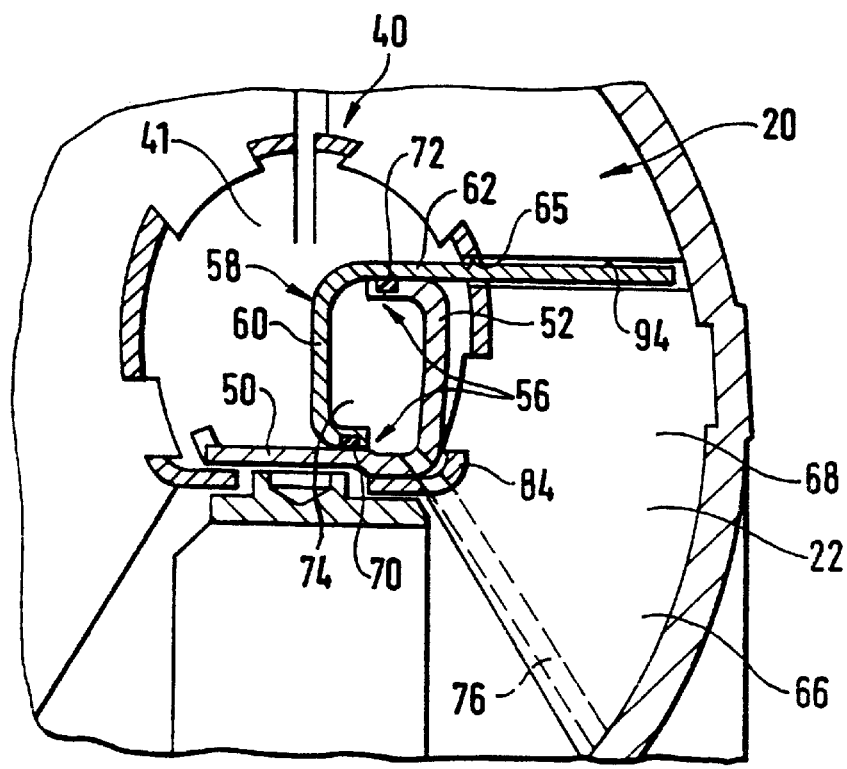
FIG. 6 shows a detail of the toroid and a choke element according to yet another embodiment, wherein a slide guide, including sealing ring, receives the choke element.

FIG. 6 shows another embodiment form of the choke element 58 which was described in detail with reference to FIGS. 2 and 3. The difference between the embodiment forms is that, in FIG. 6, the support ring 52 includes a sealing ring 84 as a connection part to the sliding rail 50 This sealing ring 84 is penetrated by the control line 76. In other respects, this embodiment form corresponds with respect to operation to the embodiment forms of FIGS. 2 and 3, so that no further explanation is necessary. It should be noted only that, because of the short sealing distance in the region of the seal 72, no individual choke projections 64 should be provided. Instead, the connection ring 62 extends up to the free end of the choke element 58. In this case, a corresponding cutout 94 in the blade arrangement 22 of the pump wheel 20 in the immediate bordering region of the connection ring 62 is advantageous. In this construction of the choke element 58, the sealing is also accordingly ensured when the choke element 58 has been moved back completely into the interior space 41 of the toroid 40 when overpressure is produced in the control chamber 74.

Figure 7:
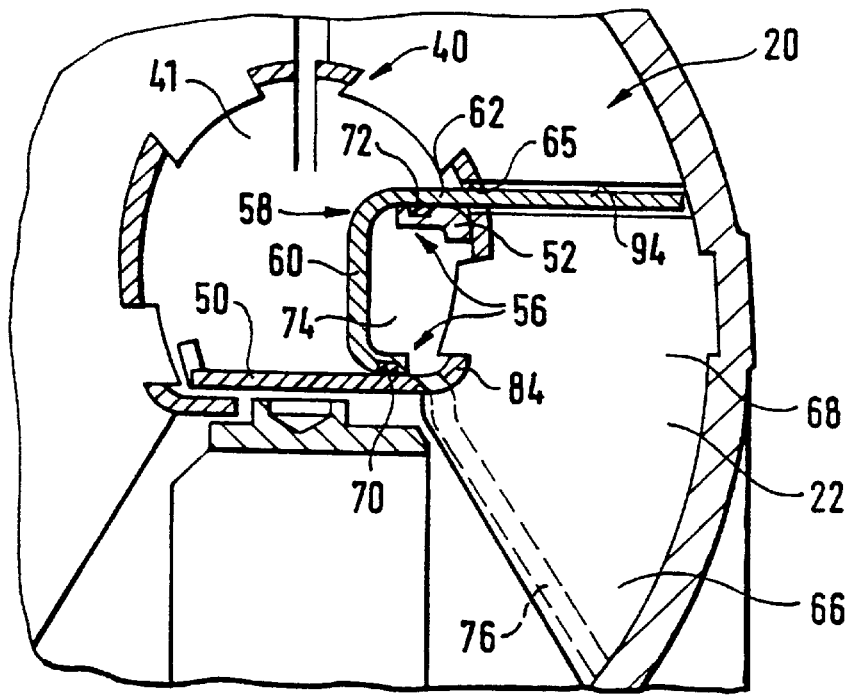
FIG. 7 shows a detail of the embodiment of the choke element in FIG. 6, wherein the sealing ring is omitted.

The construction according to FIG. 7 has basically the same choke element construction as FIG. 6, but without the sealing ring 84 between the support ring 52 and sliding rail 50.

Figure 8:
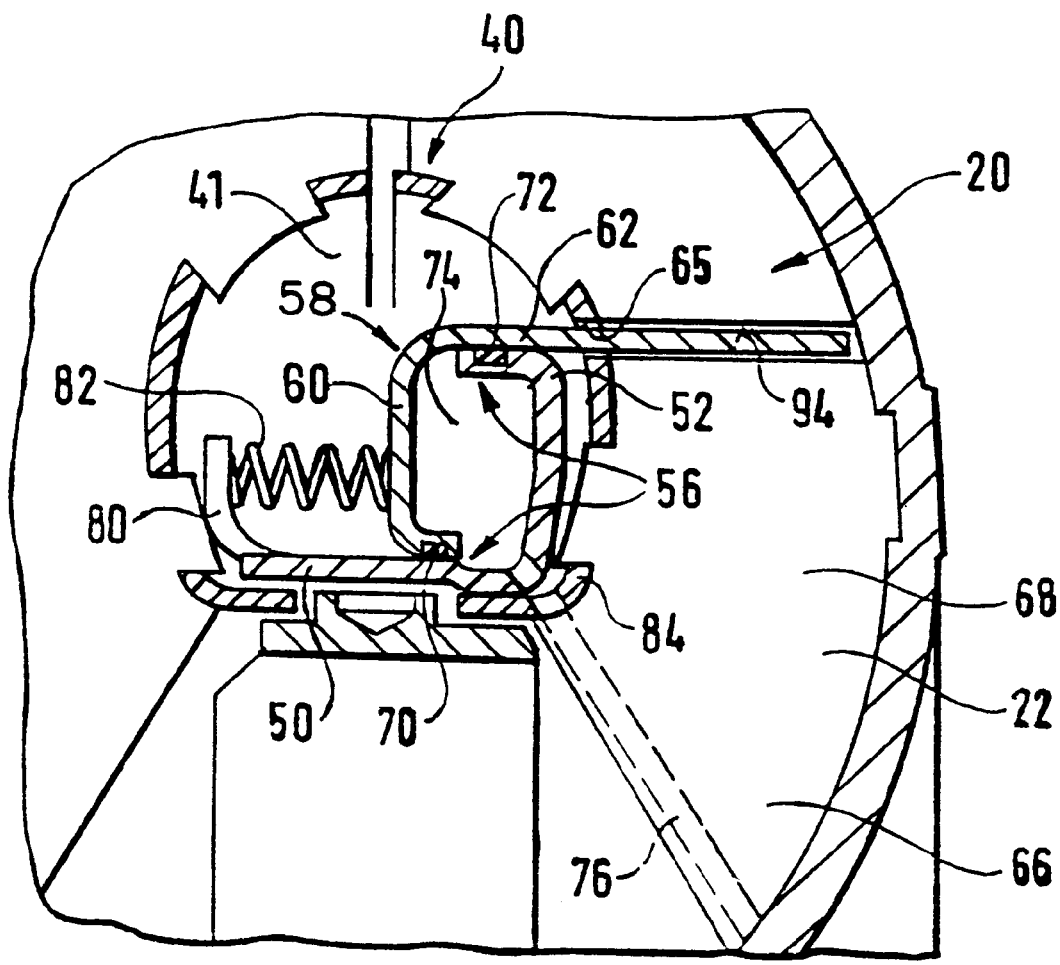
FIG. 8 shows a detail of the toroid and the choke element as in FIG. 6, but with an additional spring acting on the choke element.

FIG. 8 shows an embodiment which corresponds to that of FIG. 6, but with the addition of a spring 82 which is supported at a supporting ring 80 on the sliding rail 50 of the slide guide 56. In contrast to the variants described above, in which the choke element 58 is moved into the toroid 40 or moved out in the flow chamber 68 depending on whether or not the pressure is greater in the control chamber 74 or in the interior 41 of the toroid 40, the choke element 58 in the construction according to FIG. 8 is always under the influence of the pretensioning of the spring 82. The degree to which the spring 82 is deformed and the position which is therefore occupied by the choke element 58 between its two possible end positions is purely a matter of the adjusted overpressure in the control chamber 74. As a result, the penetration depth of the choke element 58 in the flow chamber 68 may be precisely regulated. Therefore, a regulated control device 78 is to be used especially in this construction. Of course, this operating principle of the spring 82 may also be used in the embodiment forms shown in FIGS. 2 to 5. In the embodiment shown in FIGS. 4 and 5, a spring of this kind could be arranged in the cylinder so that the outward movement of the piston rod 88 would be carried out against the action of this spring. When the pressure is relieved in the cylinder, the spring would push the piston rod 88 back into the cylinder 86.

In the embodiment examples described above, the choke element 58 is shown acting on the pump wheel 20. However, it is also conceivable to allow the choke element 58 to move into the turbine wheel 26. In this case, assuming the same operation as that described above, the choke element 58 would only have to be inserted in the toroid 40 so as to be laterally reversed.

The torque converter of the present invention may have more than one choke element and may include a choke element for each flow chamber of the pump wheel 20. FIG. 9 shows an torque converter according to the invention having two opposing choke elements 58.

The invention is not limited by the embodiments described above which are presented as examples only but can be modified in various ways within the scope of protection defined by the appended patent claims.

I claim:

1. A hydrodynamic torque converter, comprising:
   a pump wheel rotatably mounted about an axis of rotation;
   a turbine wheel rotatably mounted for rotating relative to said pump wheel about said axis of rotation;
   each said pump wheel and said turbine wheel comprising a blade arrangement forming flow chambers, said blade arrangements comprising stiffeners defining part of a toroid between said pump wheel and said turbine wheel;
   said toroid comprising a cutout adjacent a flow chamber of one of said blade arrangements;
   a converter circuit for conducting hydraulic fluid through said flow chambers of said blade arrangements and connected to a hydraulic fluid supply arrangement via a line system; and
   a choke element having a choke projection and movably mounted in said toroid so that said choke projection is operatively movable through said cutout and insertable into said flow chamber of said one of said blade arrangements for regulating a through-flow cross section of said flow chamber of said one of said blade arrangements, wherein said choke element comprises a plurality of choke projections arranged at predetermined circumferential intervals, each one of said plural choke projections being insertable into an associated flow chamber of said one of said blade arrangements.

2. A hydrodynamic torque converter, comprising:

a pump wheel rotatably mounted about an axis of rotation;

a turbine wheel rotatably mounted for rotating relative to said pump wheel about said axis of rotation;

each said pump wheel and said turbine wheel comprising a blade arrangement forming flow chambers, said blade arrangements comprising stiffeners defining part of a toroid between said pump wheel and said turbine wheel;

said toroid comprising a cutout adjacent a flow chamber of one of said blade arrangements;

a converter circuit for conducting hydraulic fluid through said flow chambers of said blade arrangements and connected to a hydraulic fluid supply arrangement via a line system; and a choke element having a choke projection and movably mounted in said toroid so that said choke projection is operatively movable through said cutout and insertable into said flow chamber of said one of said blade arrangements for regulating a through-flow cross section of said flow chamber of said one of said blade arrangements, wherein said choke element comprises a carrier disk movably arranged within said toroid and receiving said choke projection via a connection ring extending toward said one of said blade arrangements.

3. The hydrodynamic torque converter of claim 2, further comprising a sliding rail counted on a slide guide in said toroid, wherein said carrier disk is axially displacable relative to said axis of rotation on said sliding rail of said slide guide.

4. The hydrodynamic torque converter of claim 3, further comprising a support ring for guidably receiving said connection ring, wherein said slide guide receives said carrier disk via a seal and said support ring receives said connection ring via another seal.

5. The hydrodynamic torque converter of claim 4, further comprising a pressure control means, wherein said carrier disk, said connection ring, and said slide guide define a control chamber acting on said choke element, said control chamber connected to said pressure control means via a control line.

6. The hydrodynamic torque converter of claim 5, further comprising an elastic element having a first side and a second side, a support on said slide guide on which said first side of said elastic element is mounted, said second side of said elastic element contacting said carrier disk of said choke element when said choke element is fully withdrawn from said flow chamber such that said elastic element urges said choke element toward said flow chamber.

7. The hydrodynamic torque converter of claim 4, further comprising a sealing ring mounted on a side of said toroid proximate said cutout for receiving said seal and extending toward said support ring.

8. A hydrodynamic torque converter, comprising:

a pump wheel rotatably mounted about an axis of rotation;

a turbine wheel rotatably mounted for rotating relative to said pump wheel about said axis of rotation;

each said pump wheel and said turbine wheel comprising a blade arrangement forming flow chambers, said blade arrangements comprising stiffeners defining part of a toroid between said pump wheel and said turbine wheel;

said toroid comprising a cutout adjacent a flow chamber of one of said blade arrangements;

a converter circuit for conducting hydraulic fluid through said flow chambers of said blade arrangements and connected to a hydraulic fluid supply arrangement via a line system; and a choke element having a choke projection and movably mounted in said toroid so that said choke projection is operatively movable through said cutout and insertable into said flow chamber of said one of said blade arrangements for regulating a through-flow cross section of said flow chamber of said one of said blade arrangements, wherein said choke element comprises a cylinder connected to a control device via a control line and said choke projection comprises a piston rod projecting through said cutout.

9. The hydrodynamic torque converter of claim 8, wherein said cylinder annularly encloses said axis of rotation.

10. The hydrodynamic torque converter of claim 8, wherein said piston rod comprises a working surface for receiving the pressure present in said converter circuit.

* * * * *